(12) United States Patent
Zimmer

(10) Patent No.: US 6,491,439 B1
(45) Date of Patent: Dec. 10, 2002

(54) WIPER BEARING

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,093

(22) PCT Filed: Oct. 12, 1999

(86) PCT No.: PCT/DE99/03276
§ 371 (c)(1),
(2), (4) Date: Oct. 11, 2000

(87) PCT Pub. No.: WO00/51856
PCT Pub. Date: Sep. 8, 2000

(30) Foreign Application Priority Data

Feb. 27, 1999 (DE) .......................... 199 08 639

(51) Int. Cl.$^7$ ............................................... F16C 17/02
(52) U.S. Cl. ....................................................... 384/295
(58) Field of Search ................................. 384/298, 295, 384/297, 428, 441

(56) References Cited

U.S. PATENT DOCUMENTS 5,634,726 A * 6/1997 Edele et al. ............... 15/250.3
6,082,902 A * 7/2000 Muehlpforte et al. .......... 244/2

FOREIGN PATENT DOCUMENTS

| DE | 23 49 952 A | 4/1975 |
| DE | 42 10 935 A | 10/1993 |
| DE | 195 46 906 A | 6/1997 |
| DE | 196 42 184 A | 4/1998 |

* cited by examiner

Primary Examiner—Lenard A. Footland
(74) Attorney, Agent, or Firm—Michael J. Striker

(57) ABSTRACT

The invention is based on a wiper bearing, having a bearing housing (10) in which at least one bearing bush (12, 14, 16, 18, 20) for a drive shaft (22) is disposed in a bush seat (24, 26).

Figure 3:
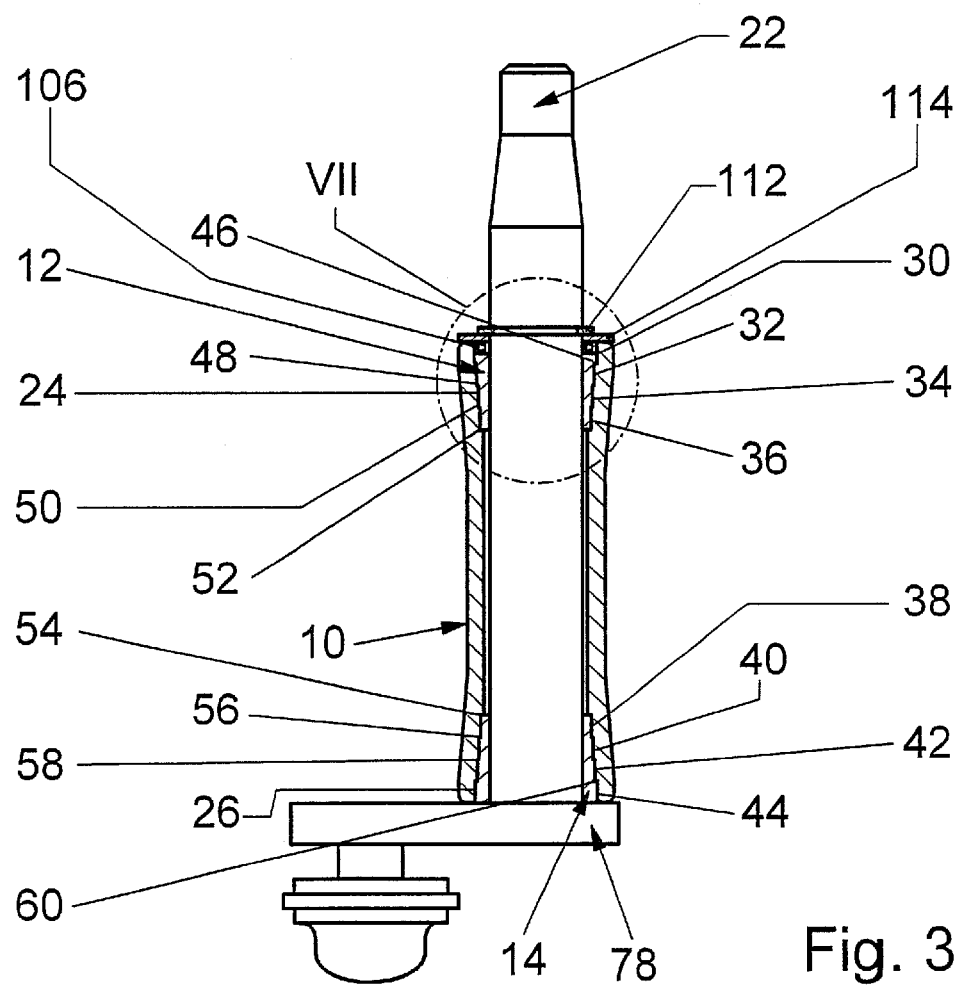

It is proposed that the bush seat (24, 26) has at least two conical jacket faces (32, 34, 36, 38, 40, 42, 44), which taper in the mounting direction (28, 100), which are separated from one another by at least one radially inward-extending shoulder (46, 48, 50, 52, 54, 56, 58, 60), of the bearing bush (12, 14, 16, 18, 20), and the bearing bush (12, 14, 16, 18, 20) has an outer contour corresponding to the contour of the bush seat (24, 26).

5 Claims, 7 Drawing Sheets

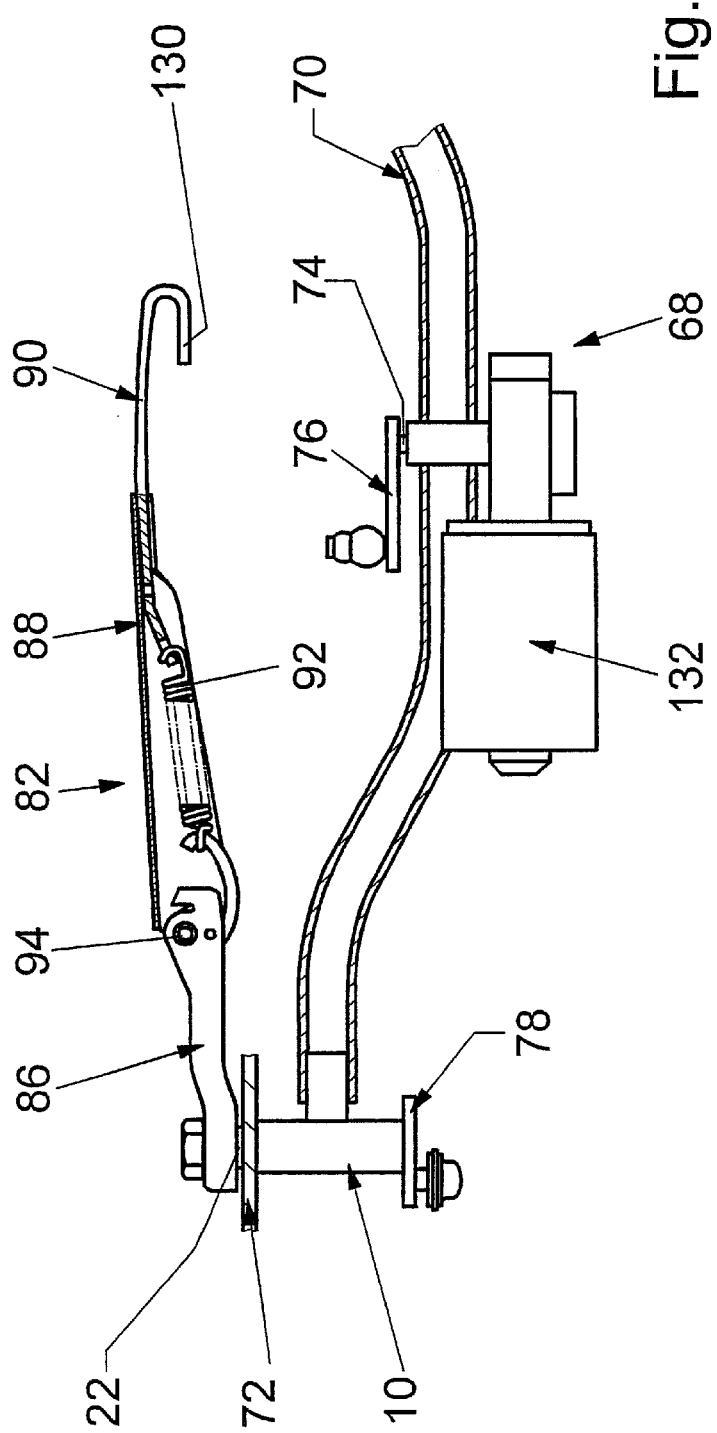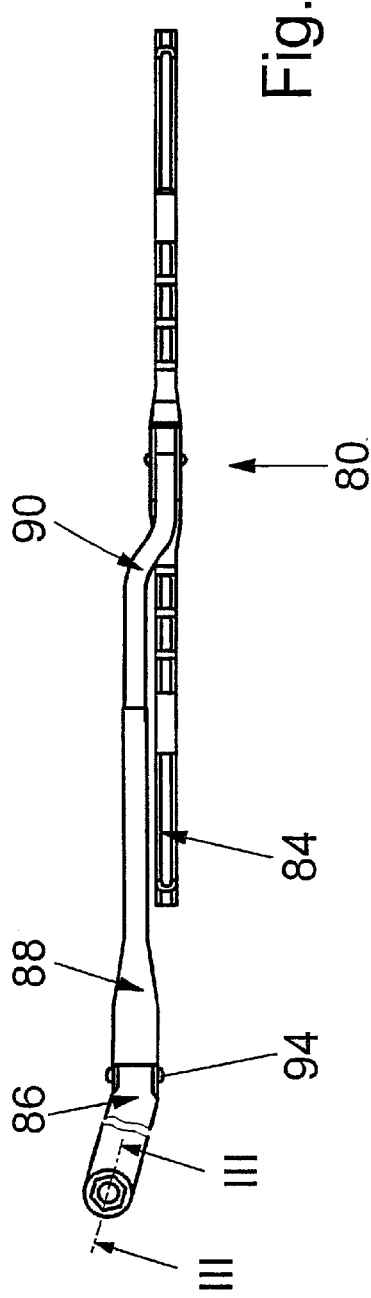

WIPER BEARING

PRIOR ART

The invention is based on a wiper bearing.

Wiper systems with multiple windshield wipers for motor vehicles are fastened with their wiper bearings directly or indirectly to a body of the motor vehicle, via a mounting plate. The mounting plate has a wiper drive mechanism with a wiper motor, whose motor shaft, via a set of rods, drives cranks that are solidly joined to one end of a drive shaft for each windshield wiper. It is also possible for only the drive shaft of one windshield wiper to be driven by the wiper motor, while another windshield wiper is connected to the first windshield wiper via a four-bar lever mechanism and has a bearing axis. The drive shaft or bearing axis is supported in a wiper bearing. The remarks hereinafter will be made with regard to a drive shaft for a bearing axis that will no longer be mentioned expressly.

At least one radial bearing is provided in the bearing housing, and on the face ends between the bearing housing and a part solidly joined to the drive shaft, an axial bearing is provided. The drive shaft protrudes out of the vehicle body and moves a wiper arm, secured to its free end, with a wiper blade over a windshield. The wiper arm has a fastening part, connected to the drive shaft, that is pivotably connected to a hinge part that is rigidly adjoined by a wiper rod. The wiper blade is suspended in a bracketlike end of the wiper rod.

As a rule, the wiper bearings have a bearing housing of zinc or plastic. In a zinc bearing housing, bearing bushes are press-fitted into fits or bush seats, and the bearing bushes radial guide the drive shaft. In a plastic bearing housing, the drive shaft can be radially supported directly in a fit or in a bearing bush press-fitted into a bush seat. In the case of zinc and plastic, the fits and bush seats can be made by die casting and injection molding, respectively. The bush seats require only little postmachining, if any.

To save weight compared with a zinc bearing housing and gain greater rigidity compared to a plastic bearing housing and higher dimensional stability, or to avoid material flow, it is known to make bearing housings out of aluminum or an aluminum alloy. In an aluminum bearing housing, as in a zinc bearing housing, bearing bushes are press-fitted into fits or bush seats. Aluminum has the property of shrinking onto a casting tool upon curing, so that especially in the case of relatively long fits or bush seats, these elements have to be postmachined. There is also increased wear on the casting tool.

ADVANTAGES OF THE INVENTION

According to the invention, a bush seat of a bearing housing has at least two conical jacket faces, tapering in the mounting direction, which are preferably separated from one another by at least one radially inward-extending shoulder. With one or preferably more shoulders, despite steep, short jacket faces, a great change in diameter in the mounting direction of the bearing bush can be attained. As a result of the great change in diameter, a short joining distance of the bearing bush upon installation and a short unmolding distance of the bearing housing out of a casting tool are attained. When the bearing housing is removed from the casting tool, at first even after a short axial unmolding distance, faces of the casting tool are far away from the jacket faces of the bush seat. The unmolding is facilitated, and in particular wear of the casting tools and the requisite postmachining of the bush seat are reduced or largely avoided.

In the mounting or assembly process, first a small outer diameter of the bearing bush meets a large inside diameter of the bush seat, and only shortly before the bearing bush is fully introduced into the bush seat do jacket faces of the bearing bush come to rest, over a short joining distance, on the jacket faces of the bush seat. Installation is facilitated, and incorrect installation where the bearing bush is inserted with the wrong face end first is avoided. The jacket faces of the bush seat can be embodied steeply, with a requisite casting obliquity for unmolding of about 1° to 2°, despite a great change in diameter.

The drive shaft is driven by cranks and moves a wiper arm with a wiper blade over a windshield. This creates shear forces acting periodically on the drive shaft. The shear forces are supported via the bearing bush, the bearing housing, and the mounting plate on the vehicle body. Because of the conical faces between the bearing bush and the bearing housing, a force component counter to the mounting direction arises. However, with steep jacket faces, this force component is especially small, and the bearing bush remains reliably secured without play in the bearing housing. Also with steep jacket faces and an only slight mounting force, reliable self-locking is attained, and at even a small radially inward-oriented pressure onto the bearing bush, a secure, firm connection is made. The bearing bush largely retains its shape and especially its inside diameter, so that a drive shaft can easily be introduced into the bearing bush and guided exactly by it without play, without requiring major calibration effort or expense.

The bearing housing according to the invention of a wiper bearing having the stepped bush seat can be cast from zinc, plastic, or some other material thought suitable by one skilled in the art. Especially advantageously, however, the invention is employed with materials that are difficult to unmold, as in the case of bearing housings of aluminum or an aluminum alloy. Aluminum bearing housings are especially lightweight and rigid and can easily be unmolded with little wear from a casting tool, because of the short jacket faces and great change in diameter of the bush seat that are provided according to the invention. Postmachining of the bush seat is furthermore avoided largely or even completely.

In one feature of the invention, the bearing bush has a collar. The drive shaft can be supported on the collar of the bearing bush on an advantageous, large axial bearing face. Furthermore, the collar can be used as a radial running face for a lip seal.

Production variations of the bearing housing can change the length of the bearing housing and the axial positions of the shoulders. To achieve an exact spacing between two axial bearing faces or an exact length of the bearing housing with one or two bearing bushes, the bearing bushes are press-fitted to size and with their face ends form axial bearing faces, in particular bearing bushes with a collar. In order for the bearing bush to be securely fixed in the mounting direction, it advantageously rests on a stop.

According to the invention, at least one and preferably all the shoulders are disposed offset counter to the mounting direction, so that when the bearing bush is press-fitted to size, the bearing bush is plastically deformed at the shoulders. The length of the bearing housing having the bearing bush can be brought to exact size, and the bearing bush rests on a stop. It is also assured that the bearing bush is fastened with a secure hold, without play, in the bearing housing. In the region of the shoulder, as a result of the plastic deformation, material comprising the bearing bush places itself without play over the circumference on the bush seat.

The plastic deformation can cause material of the bearing bush to be cast off inward. In one feature, it is provided that in the mounting of the bearing bush, a cylindrical pin is disposed in the bearing bush. As a result, the bearing bush can be calibrated in a single step axially and, by the cylindrical pin, radially.

DRAWING

Further advantages will become apparent from the ensuing description of the drawings. Exemplary embodiments of the invention are shown in the drawings. The drawings, description and claims contain numerous characteristics in combination. One skilled in the art will also expediently consider the characteristics individually and put them together to make appropriate further combinations.

Figure 4:
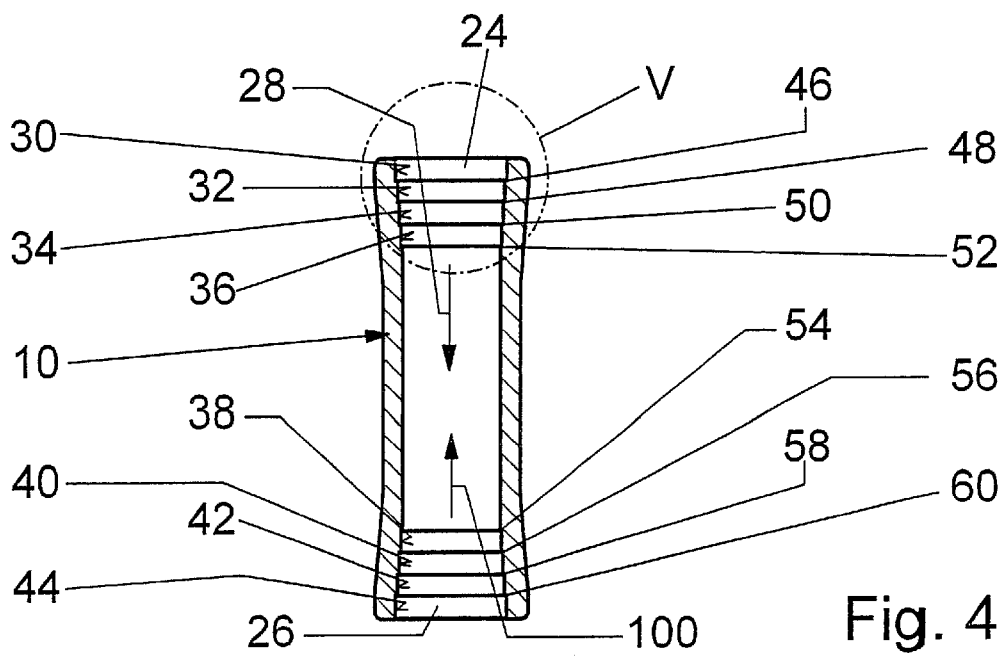
Figure 5:
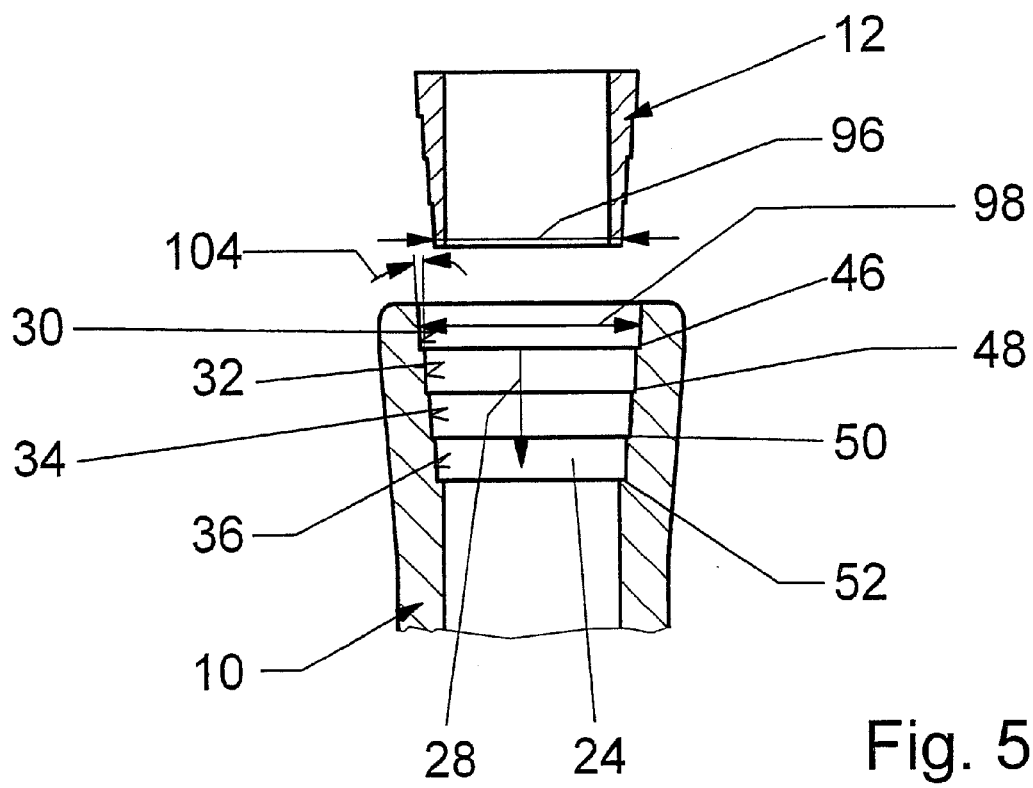
Figure 6:
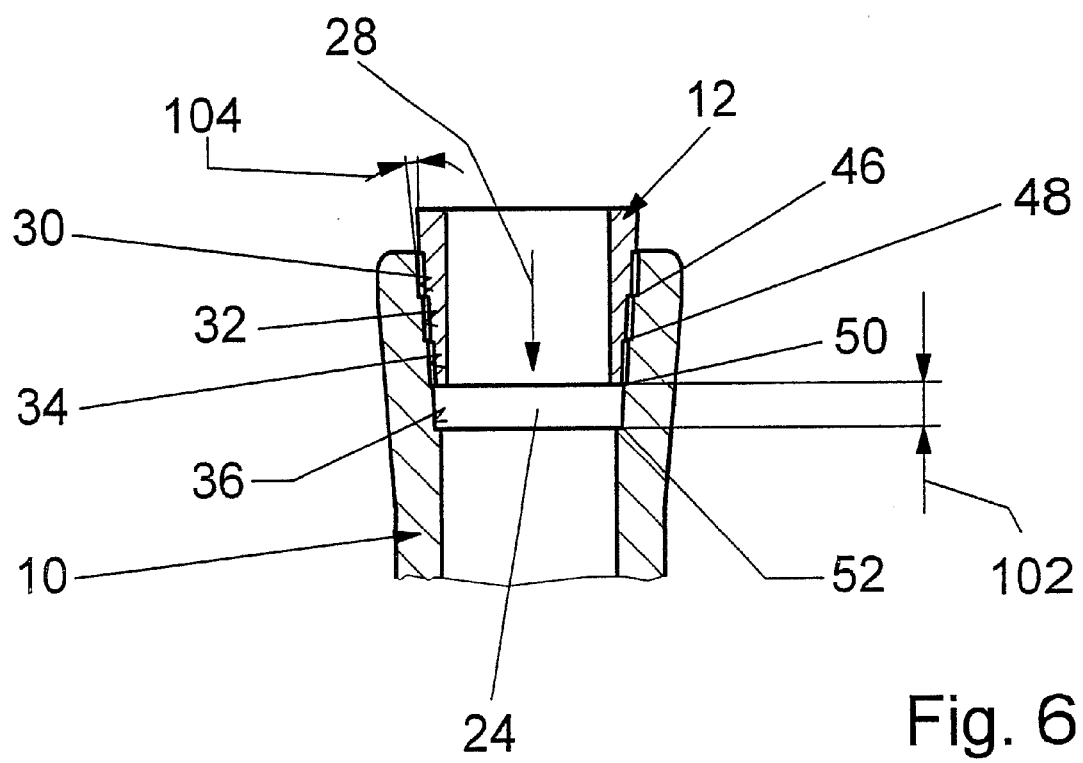
Figure 7:
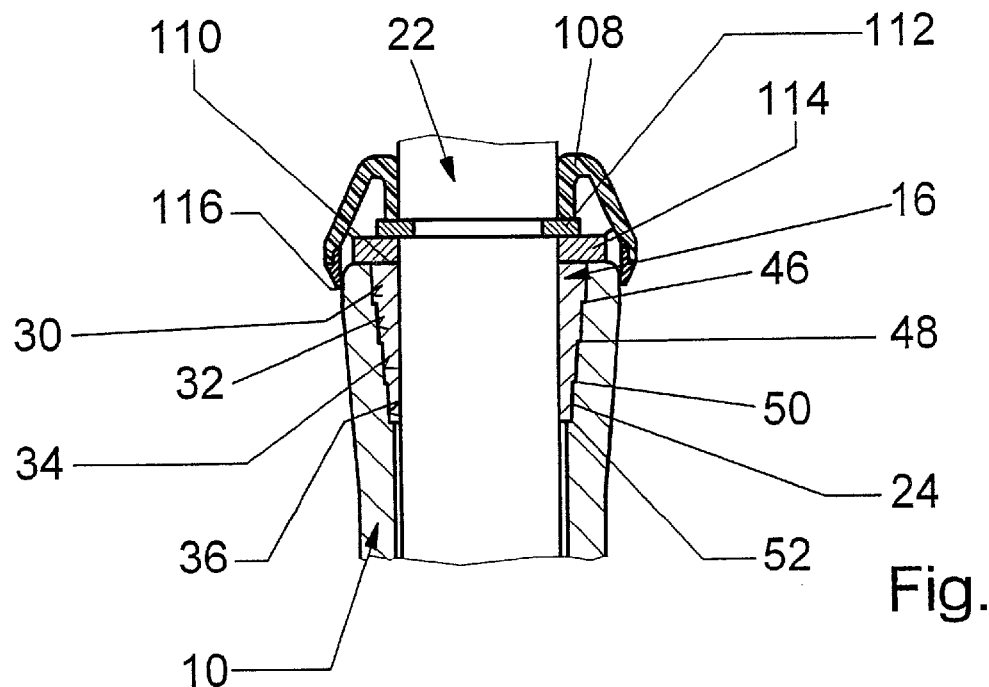
Figure 8:
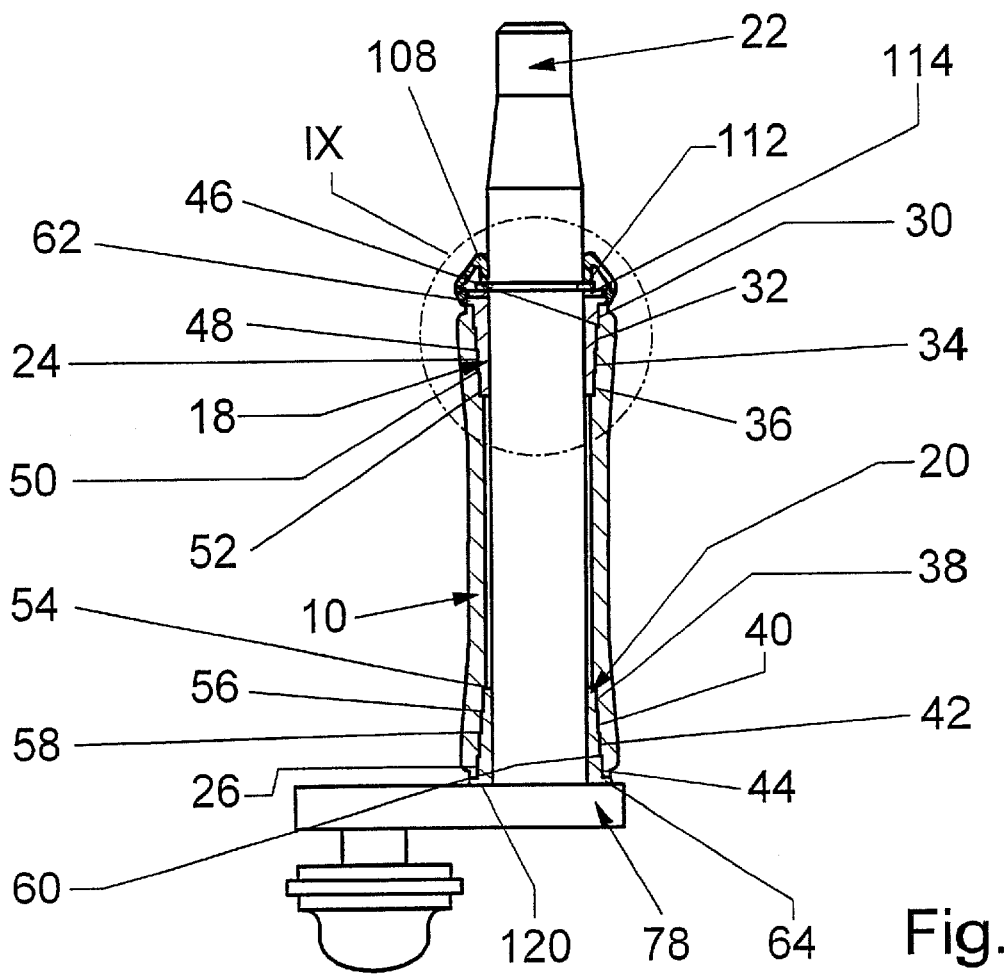
Figure 9:
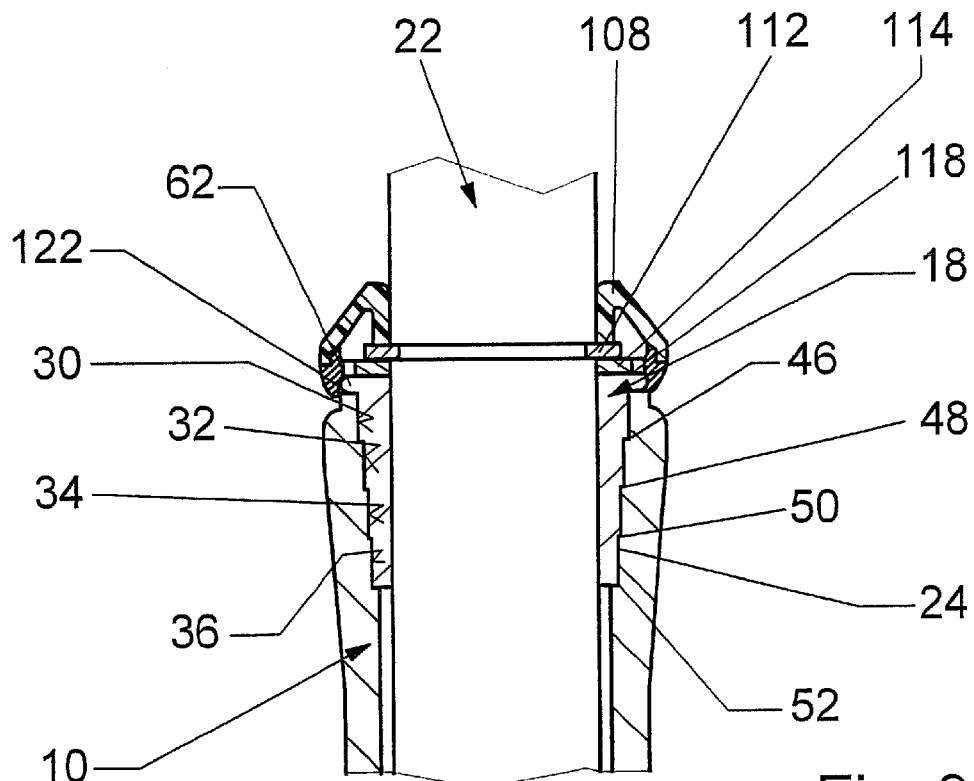
Figure 10:
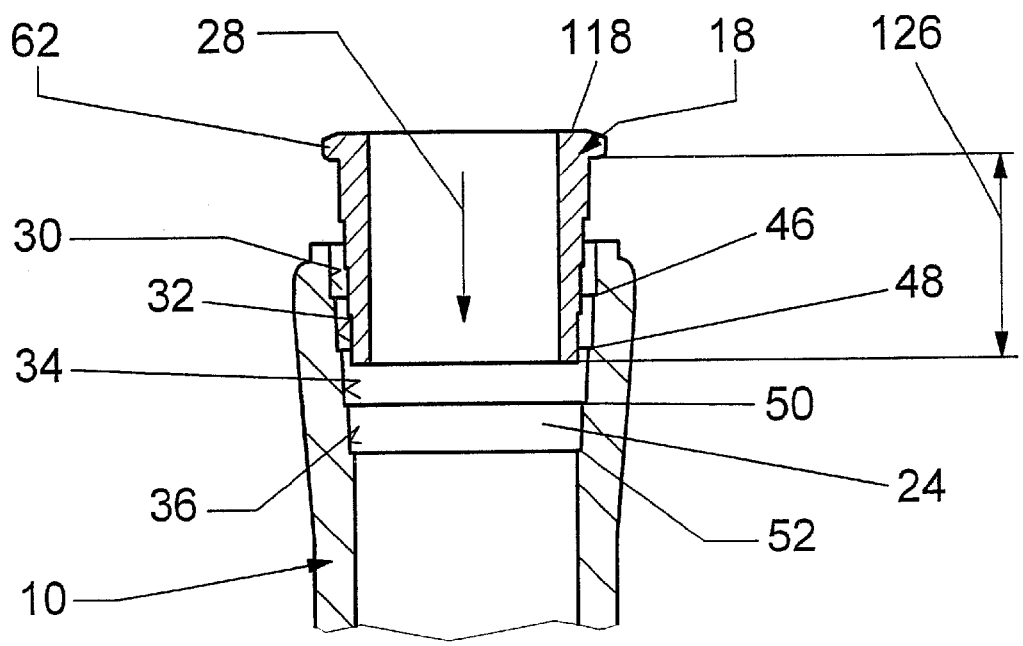
Figure 11:
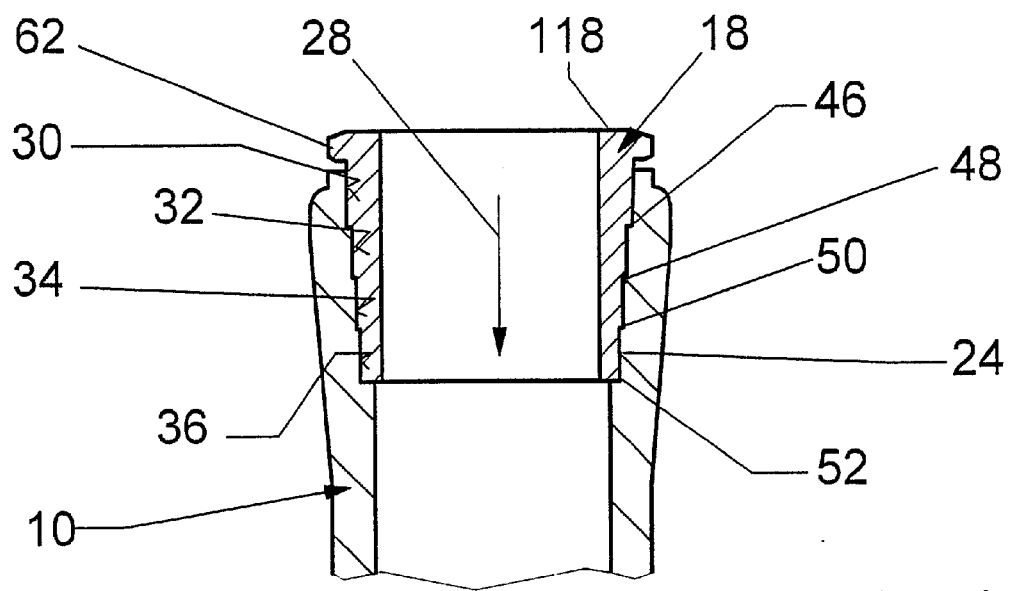
Figure 12:
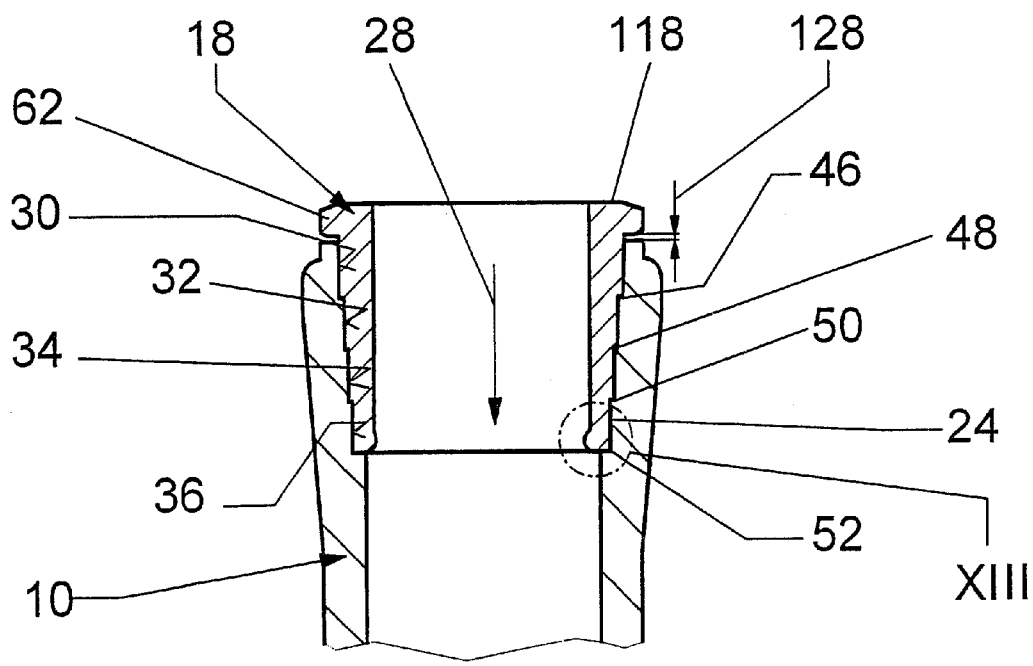
Figure 13:
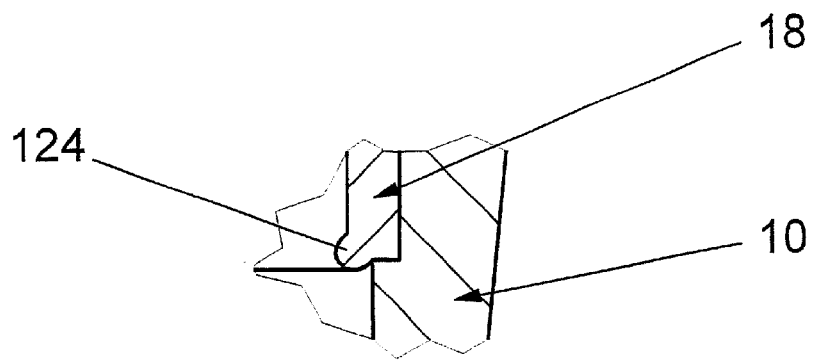
Figure 14:
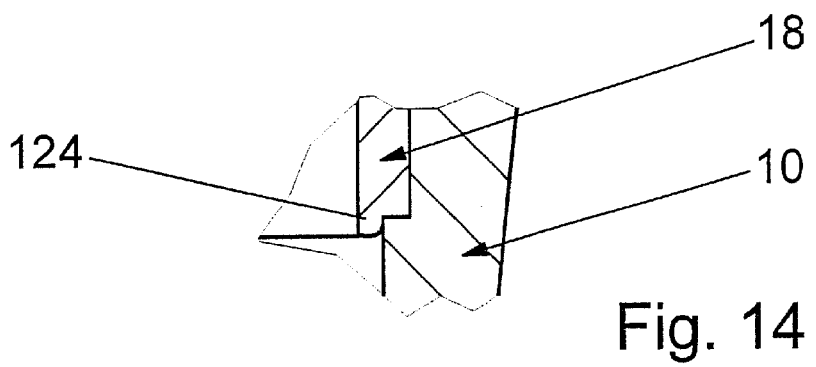
Figure 15:
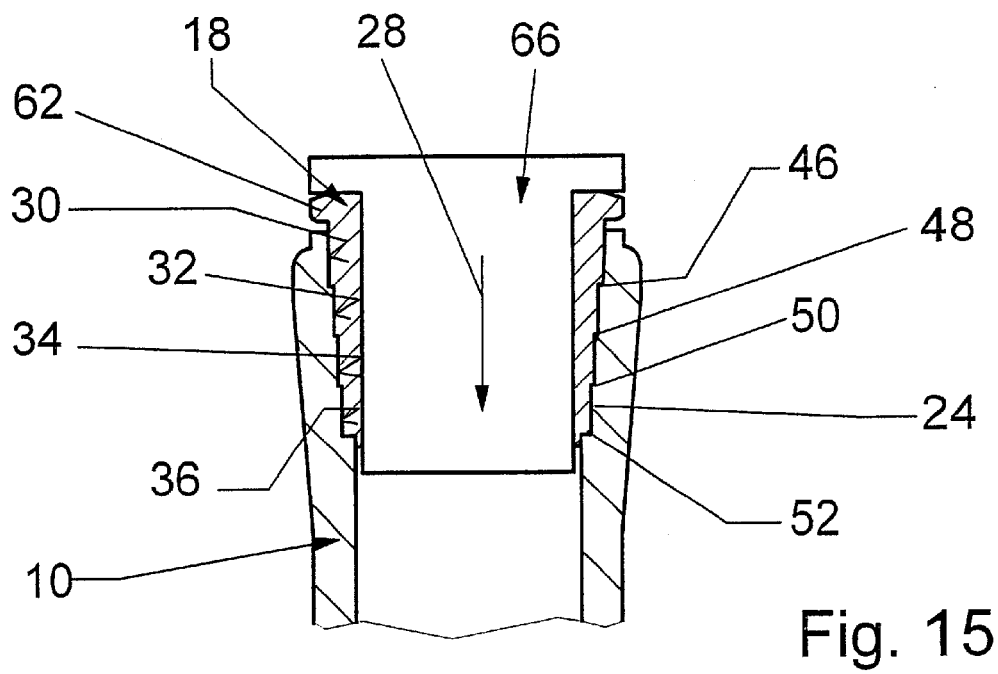

Shown are:

FIG. 1, a detail of a wiper bearing with a wiper arm;

FIG. 2, a wiper arm with a wiper blade seen from above;

FIG. 3, an enlarged detail of a section taken along the line III—III of FIG. 2;

FIG. 4, a bearing housing;

FIGS. 5 and 6, an enlarged detail V of FIG. 4, showing mounting of a bearing bush;

FIG. 7, a variant of a detail VII in FIG. 3;

FIG. 8, a variant of FIG. 3, with a bearing bush with a collar;

FIG. 9, an enlarged detail IX of FIG. 8;

FIG. 10, a bearing housing with a bearing bush upon being mounted;

FIG. 11, a bearing housing with a bearing bush press-fitted to a stop;

FIG. 12, a bearing housing with an axially calibrated bearing bush;

FIG. 13, an enlarged detail XIII of FIG. 12;

FIG. 14, an apparatus of FIG. 13, with an axially and radially calibrated bearing bush; and FIG. 15, a variant of FIG. 10 with a cylindrical mounting pin.

DESCRIPTION OF THE EXEMPLARY EMBODIMENTS

FIG. 1 shows a detail of a wiper system 68 for a motor vehicle, whose wiper bearings are fastened with a bearing housing 10 via a mounting plate 70 to a body 72 of the motor vehicle. The mounting plate 70 has a wiper drive mechanism with a wiper motor 132, whose motor shaft 74, via a crank 76 and a set of rods not shown in further detail, drives cranks 78 that are each solid connected to one end of a drive shaft 22 for a windshield wiper 80. The drive shaft 22 is radially and axially supported in the bearing housing 10, protrudes from the body 72, and moves a wiper arm 82, which is secured to its free end and has a wiper blade 84, over a windshield (FIG. 2). The wiper arm 82 has a fastening part 86, which is connected to the drive shaft 22 and is connected pivotably via a toggle joint 94 to a hinge part 88, which is rigidly adjoined by a wiper rod 90. The wiper blade 84 is suspended from a bracketlike end 130 in the wiper rod 90. A requisite contact pressure of the wiper blade 84 on the motor vehicle window is achieved with a tension spring 92, which braces the fastening part 86 and the hinge part 88 together with the wiper rod 90 via the toggle joint 94.

In the bearing housing 10, made of aluminum, two bearing bushes 12, 14 are press-fitted into two bush seats 24, 26, in which the drive shaft 22 is guided (FIG. 3). According to the invention, the bush seats 24, 26 have at least two and in this exemplary embodiment four conical jacket faces 30, 32, 34, 36, 38, 40, 42, 44, tapering in the mounting direction 28 and 100, respectively, which are separated from one another by three radially inward-oriented shoulders 46, 48, 50, 52, 54, 56, 58, 60 and are defined on the inside by a shoulder 52, 54 (see FIGS. 3, 4, 5 and 6).

With the shoulders 46, 48, 50, 52, 54, 56, 58, 60, with a plurality of short, steep jacket faces 30, 32, 34, 36, 38, 40, 42, 44, a great change in diameter in the mounting direction 28, 100 of the bearing bush 12, 14 is attained. In the mounting of the bearing bush 12, which is made from a sintered material and has an outer contour corresponding to the contour of the bush seat 24, a small outer diameter 96 of the bearing bush 12 first meets a large inside diameter 98 of the bush seat 24, and only shortly before the bearing bush 12 has been introduced all the way into the bush seat 24 do the jacket faces of the bearing bush 12 come to rest, via a short joining distance 102, on the jacket faces 30, 32, 34, 36 of the bush seat 24 (FIGS. 5 and 6). The mounting is facilitated, and incorrect mounting where the bearing bush 12 is inserted first by the wrong face end, is avoided. Despite a great change in diameter, the jacket faces 30, 32, 34, 36 of the bush seat 24 can still be embodied steeply, with a requisite casting obliquity for unmolding, with an angle 104 of approximately 1°. The remarks made about the bearing bush 12 mounted in the mounting direction 28 apply accordingly for the bearing bush 14 mounted in the mounting direction 100.

Besides easier mounting of the bearing bushes 12, 14, the great change in diameter effected by the shoulders 46, 48, 50, 56, 58, 60 means that when the bearing housing 10 is unmolded from a casting mold, not shown in further detail, faces of the casting tool are far away from the jacket faces 30, 32, 34, 36, 38, 40, 42, 44 even after only a short axial unmolding distance corresponding to the joining distance 102. The unmolding is facilitated and in particular the wear of the casting tools and the required postmachining of the bush seat 24, 26 are reduced or largely avoided. With steep jacket faces 30, 32, 34, 36, 38, 40, 42, 44, a secure hold of the bearing bush 12, 14 is attained, with only slight radially inward-oriented pressure on the bearing bush 12, 14.

The bearing housing 10 in FIG. 3 is sealed off in the direction of the end of the shaft by an O-ring 106. The bearing bush 12 ends just before one face end of the bearing housing 10. This creates a free space between the bearing housing 10 and the drive shaft 22, into which space the O-ring 106 is inserted. Instead of being sealed off from the outside by an O-ring 106, the bearing housing 10 and a bearing bush 16 can be sealed off from the outside with a lip seal 108 on a radial running face 116 on the bearing housing 10, as shown in FIG. 7. A face end 110 pointing in the direction of the end of the shaft can advantageously be used as an axial bearing face for the drive shaft 22, which face is supported via a clamping ring 112 and a stop ring 114 on the bearing housing 10 and the bearing bush 16. The components that remain substantially the same are identified by the same reference numerals throughout.

In an exemplary embodiment in FIG. 8, two bearing bushes 18, 20 are each embodied with a respective collar 62, 64. The drive shaft 22 and the cranks 78 are supported on an advantageous, large axial bearing face 118, 120 on the collar 62, 64 of the bearing bushes 18, 20. The collar 62 furthermore forms a favorable radial running face 122 for the lip seal 108 (FIG. 9).

According to the invention, the shoulders 46, 48, 50, 52, 54, 56, 58, 60 are disposed offset counter to the mounting direction 28 or 100 of the bearing bush 12, 14, 16, 18, 20, so when the bearing bush 12, 14, 16, 18, 20 is press-fitted to size, the bearing bush 12, 14, 16, 18, 20 is plastically deformed at the shoulders 46, 48, 50, 52, 54, 56, 58, 60. FIGS. 10–14 show a mounting sequence. The bearing bush 18 is press-fitted to a stop into the bush seat 24 in a first step (FIGS. 10 and 11) and thus rests on the shoulders 46, 48, 50, 52. In a second step, the bearing bush 18 is press-fitted farther into the bush seat 24, until a predetermined axial position or a predetermined length of the bearing housing 10 with the bearing bushes 18 and 20 is attained (FIGS. 12 and 13). Material from the bearing bush 18 is plastically deformed at the shoulders 46, 48, 50, 52 and places itself over the circumference, in the region of the shoulders 46, 48, 50, 52, without play and with a largely uniform pressure per unit of surface area on the bush seat 24, unless this has already occurred prior to the plastic deformation. The bearing bush 18 is fastened at the desired position in the bearing housing 10 with a secure hold, without play. To prevent the collar 62 from coming to rest on the bearing housing 10 before an exact position or an exact size is reached and prevents the axial calibration, the length 126 of the bearing bush 18 as far as the collar 62 (FIG. 10) is selected in such a way, taking tolerances into account, that after the press-fitting of the bearing bush 18 to an exact size, a play 128 always exists between the collar 62 and the bearing housing 10 (FIG. 12).

As a result of the plastic deformation, material 124 comprising the bearing bush 18 can be cast off inward (FIG. 13). In a further mounting step, in a radial calibration of the bearing bush 18, the material 124 can be positively displaced with a cylindrical pin (FIG. 14). However, it is advantageous for a cylindrical mounting pin 66 already to be disposed in the bearing bush 18 in the mounting operation (FIG. 15). As a result, in a single step, the bearing bush 18 is calibrated axially and, by the cylindrical mounting pin 66, radially.

What is claimed is:

1. A wiper bearing, having a bearing housing (10) in which at least one bearing bush (12, 14, 16, 18, 20) for a drive shaft (22) is disposed in a bush seat (24, 26), characterized in that the bush seat (24, 26) has at least two conical jacket faces (32, 34, 36, 38, 40, 42, 44), which taper in the mounting direction (28, 100) of the bearing bush (12, 14, 16, 18, 20), and the bearing bush (12, 14, 16, 18, 20) has an outer contour corresponding to the contour of the bush seat (24, 26).

2. The wiper bearing of claim 1, characterized in that the bearing housing (10) is of aluminum or an aluminum alloy.

3. The wiper bearing of claim 1, characterized in that the jacket faces are separated from one another by at least one radially inward-extending shoulder (46, 48, 50, 52, 54, 56, 58, 60).

4. The wiper bearing of claim 1, characterized in that the bearing bush (18, 20) has a collar (62, 64), which forms an axial bearing face (118, 120).

5. The wiper bearing of claim 1, characterized in that at least one shoulder (46, 48, 50, 52, 54, 56, 58, 60) is disposed offset, counter to the mounting direction (28, 100), and the bearing bush (12, 14, 16, 18, 20) is plastically deformed to size, at least on the one step (46, 48, 50, 52, 54, 56, 58, 60), by the press-fitting into the bush seat (24, 26).

\* \* \* \* \*